(12) United States Patent
Galvin

(10) Patent No.: US 12,584,725 B2
(45) Date of Patent: Mar. 24, 2026

(54) CONTINUOUS ROTATION ANGLE DETECTION SENSOR 360 DEG SMD

(71) Applicant: Samson Fox Galvin, Concord, NH (US)

(72) Inventor: Samson Fox Galvin, Concord, NH (US)

( * ) Notice: Subject to any disclaimer, the term of this patent is extended or adjusted under 35 U.S.C. 154(b) by 227 days.

(21) Appl. No.: 18/649,889

(22) Filed: Apr. 29, 2024

(65) Prior Publication Data

US 2024/0426592 A1      Dec. 26, 2024

Related U.S. Application Data

(60) Provisional application No. 63/523,002, filed on Jun. 23, 2023.

(51) Int. Cl.
*G01B 7/30* (2006.01)
*G01B 7/00* (2006.01)

(52) U.S. Cl.
CPC .............. *G01B 7/30* (2013.01); *G01B 7/003* (2013.01)

(58) Field of Classification Search
CPC .......... G01B 7/30; G01B 7/003; H01C 10/32; G01D 5/165
USPC ................................ 324/207.25, 207.11, 200
See application file for complete search history.

(56) References Cited

U.S. PATENT DOCUMENTS

| 5,027,648 | A | * | 7/1991 | Filleau | ................... | G01D 5/165 |
| | | | | | | 73/117.02 |
| 5,113,172 | A | | 5/1992 | Lang | | |
| 5,187,464 | A | * | 2/1993 | Forgacs | ................ | H01C 10/32 |
| | | | | | | 338/196 |
| 5,837,908 | A | * | 11/1998 | Ng | .......... | G01D 21/02 |
| | | | | | | 73/862.325 |
| 6,876,291 | B2 | * | 4/2005 | Teppan | .................. | G01R 1/203 |
| | | | | | | 338/307 |
| 2010/0185412 | A1 | | 7/2010 | Abe et al. | | |
| 2015/0192403 | A1 | | 7/2015 | Ataka et al. | | |
| 2024/0109586 | A1 | * | 4/2024 | Kim | ................... | B62D 15/0225 |

* cited by examiner

*Primary Examiner* — Giovanni Astacio-Oquendo

(57) ABSTRACT

The present invention relates to a rotation angle detection sensor designed to overcome the limitations of current potentiometers in measuring angular positions. The sensor incorporates a resistive circular path and multiple collector paths or communicator tracks, enabling continuous measurements of rotation angles from 0 to 360 degrees in either the clockwise or the counterclockwise direction. The sensor achieves enhanced accuracy compared to traditional potentiometers by combining two parallel potentiometer paths. The compact design, comparable in size to existing potentiometers, eliminates dead space and offers a cost-effective alternative to non-contacting rotary position sensors. The sensor's functionality is supported by a fixed substrate or circuit board, slide contacts, spring mechanisms, and housing. Additionally, various circuit configurations and measurement methods are provided to process the output signals and determine the rotation angles accurately. Overall, this innovation presents a versatile and efficient solution for angle detection in a compact form.

14 Claims, 22 Drawing Sheets

101

```
#include <math.h>

//INITIALIZING VALUES float v1 =0; //OUTPUT "V1"

float v2 =0; //OUTPUT "V2' float calc_angle = 0; //CALCULATED ANGULAR POSITION (DEGREES)

void setup() {

Serial.begin(9600);

} void loop() { val();//RECORD DATA

Serial.println(calc_angle+num_rotations*360);//PRINT CURRENT POSITION delay(50);

} void val(){ v1 = analogRead(A0); //READ THE VOLTAGE OF "V1" IN NUMBER OF BITS (FOR ARDUINO UNO: 1023)

v2 = analogRead(A1); //READ THE VOLTAGE OF "V2" IN NUMBER OF BITS (FOR ARDUINO UNO: 1023)

//CONVERT 90 DEG OFFSET TRIANGULAR WAVES INTO ANGULAR DATA calc_angle = atan2(sin((v2/1023*2-1)*PI/2),sin((v1/1023*2-1)*PI/2))*180/PI;

```
#include <math.h>

//INITIALIZING VALUES float v1 =0; //OUTPUT "V1"

float v2 =0; //OUTPUT "V2' float calc_angle = 0; //CALCULATED ANGULAR POSITION (DEGREES)

float calc_angle_old = calc_angle; //RECORD AND STORE LAST CALCULATED VALUE int num_rotations = 0; //RECORD HOW MANY ROTATIONS HAVE BEEN MADE void setup() {

Serial.begin(9600);

} void loop() { val();//RECORD DATA

Serial.println(calc_angle+num_rotations*360);//PRINT CURRENT POSITION COMBINED WITH NUMBER OF ROTATIONS delay(50);

} void val(){ v1 = analogRead(A0); //READ THE VOLTAGE OF "V1" IN NUMBER OF BITS (FOR ARDUINO UNO: 1023)

v2 = analogRead(A1); //READ THE VOLTAGE OF "V2" IN NUMBER OF BITS (FOR ARDUINO UNO: 1023)

//CONVERT 90 DEG OFFSET TRIANGULAR WAVES INTO ANGULAR DATA calc_angle = atan2(sin((v2/1023*2-1)*PI/2),sin((v1/1023*2-1)*PI/2))*180/PI;

if (abs(calc_angle-calc_angle_old)>180){ //USE SIMPLE COMPUTER LOGIC TO DETERMINE IF A ROTATION WAS MADE num_rotations = num_rotations-calc_angle/abs(calc_angle);

} calc_angle_old = calc_angle; //STORE PREVIOUS ANGULAR VALUE

CONTINUOUS ROTATION ANGLE DETECTION SENSOR 360 DEG SMD

CROSS-REFERENCE TO RELATED APPLICATIONS

This application claims priority to and is a continuation-in-part of U.S. provisional application No. 63/523,002 filed on Jun. 23, 2023, and the subject matter of that provisional patent application is incorporated by reference into this utility patent application.

FIELD OF THE INVENTION

The present invention relates to a rotation angle detection sensor designed to overcome the limitations of current potentiometers in measuring angular positions. The sensor incorporates a resistive circular path and multiple collector paths or communicator tracks, enabling continuous measurements of rotation angles from 0 to 360 degrees in either the clockwise or the counterclockwise direction. The sensor achieves enhanced accuracy compared to traditional potentiometers by combining two parallel potentiometer paths.

The compact design, comparable in size to existing potentiometers, eliminates dead space and offers a cost-effective alternative to non-contacting rotary position sensors. The sensor's functionality is supported by a fixed substrate or circuit board, slide contacts, spring mechanisms, and a housing. Additionally, various circuit configurations and measurement methods are provided to process the output signals and determine the rotation angles accurately. Overall, this innovation presents a versatile and efficient solution for angle detection in a compact form.

BACKGROUND OF THE INVENTION

A rotary position sensor is used to measure the angular position of a rotatable object relative to a fixed member. There are two types of rotary position sensors, contacting and non-contacting rotary sensors. Rotary potentiometers are a type of contacting position sensor that uses a resistive track and a wiper to measure the voltage between two terminals. This disclosure is related to contacting rotary position sensors and signal processing for recording accurate angular positions.

BRIEF DESCRIPTION OF THE PRIOR ART

Current potentiometers consist of a collector path and thick film resistive circular arc connected to two terminals. A slide contact is used to make contact between the resistive arc and the collector path. The measured angular range is equal to the available space between the two terminals, and the voltage response from the collector path is proportional to the rotation angle. Because the terminals take up space, most resistive rotary position sensors have an operational range from about 0-330 degrees with typically 30 degrees of dead space.

Previous designs have solved this issue by providing a secondary collector path and sweeper offset by a certain angle, the two output values are then switched when one is located in the dead space (PCT Pub. No.: WO89/00331), (PCT Pub. No.: US 2015/0192403A1). Switching the redundant signal has limitations, can cause additional errors, and requires two analog pins to read the output of the secondary collector path. Other designs have implemented various additional sensors such as Hall sensors (PCT Pub. No.: US 2010/0185412 A1). Additionally, multi-turn potentiometers can rotate more than 360 degrees, but they cannot rotate indefinitely. For measuring angles of rotation greater than 360 degrees and for an indefinite number of rotations, non-contacting rotary position sensors are often used. However, most non-contacting rotary position sensors require more advanced digital connections than potentiometers and are more complex and expensive.

BRIEF SUMMARY OF THE INVENTION

The invention is a rotary position sensor that overcomes the limitations of current potentiometers. It utilizes a circular resistive paste to create two parallel potentiometer paths. This design allows continuous absolute measurements from 0 to 360 degrees and infinite rotation in both the clockwise and the counterclockwise directions. Because two parallel paths are used, and the redundant signal is combined instead of switched, this design can provide twice the accuracy of a normal potentiometer voltage reading. The straightforward design is created for ease of manufacturing and utilizes inexpensive components to reduce cost. The overall size is comparable to current potentiometers but is slightly wider due to the additional communicator path needed. The novelty lies in the 360 degrees of continuous resistive film and utilization of signal combination in order to reduce error, as well as a cost-effective circuit and slide contact assembly that utilizes multiple contact points to reduce error.

The proposed sensor is a rotational angle-detection sensor designed to measure the rotation angle of a shaft relative to a sensor housing. The sensor includes a sensor housing that accommodates a printed circuit board (PCB), which supports key components. These components include an electrical input, a ground, first and second electrical outputs, a continuous circular resistive track electrically connected to the input and the ground, the first communicator track connected with the first electrical output, and the second communicator track connected with the second electrical output. Within the sensor housing, a rotating disk is housed to engage and be rotated by a motor shaft. The rotating disk supports a conductive body for electrically engaging with the continuous circular resistive track and the first and second communicator tracks. The surface of the PCB facing the rotating disk accommodates the continuous resistive track, first communicator track, and second communicator track. The conductive body is oriented to align with these tracks. The angle of rotation of the shaft, relative to the sensor housing, is measured by integrating the first electrical output and the second electrical output with each other.

BRIEF DESCRIPTION OF THE FIGURES

The above and other objects, aspects, features, advantages, and applications of this disclosure will be more apparent from the following drawings in conjunction with the accompanying description. It should be understood that like reference numbers used in the drawings identify like components.

FIG. 12 illustrates the code used to combine the output voltages of FIG. 11-11C into a precise angular measurement from –180 to 180 degrees on an Arduino board.

FIG. 13 depicts a modified version of the code of FIG. 12, enabling the angular measurement to dynamically increase or decrease indefinitely.

DETAILED DESCRIPTION OF THE INVENTION

Figure 1:
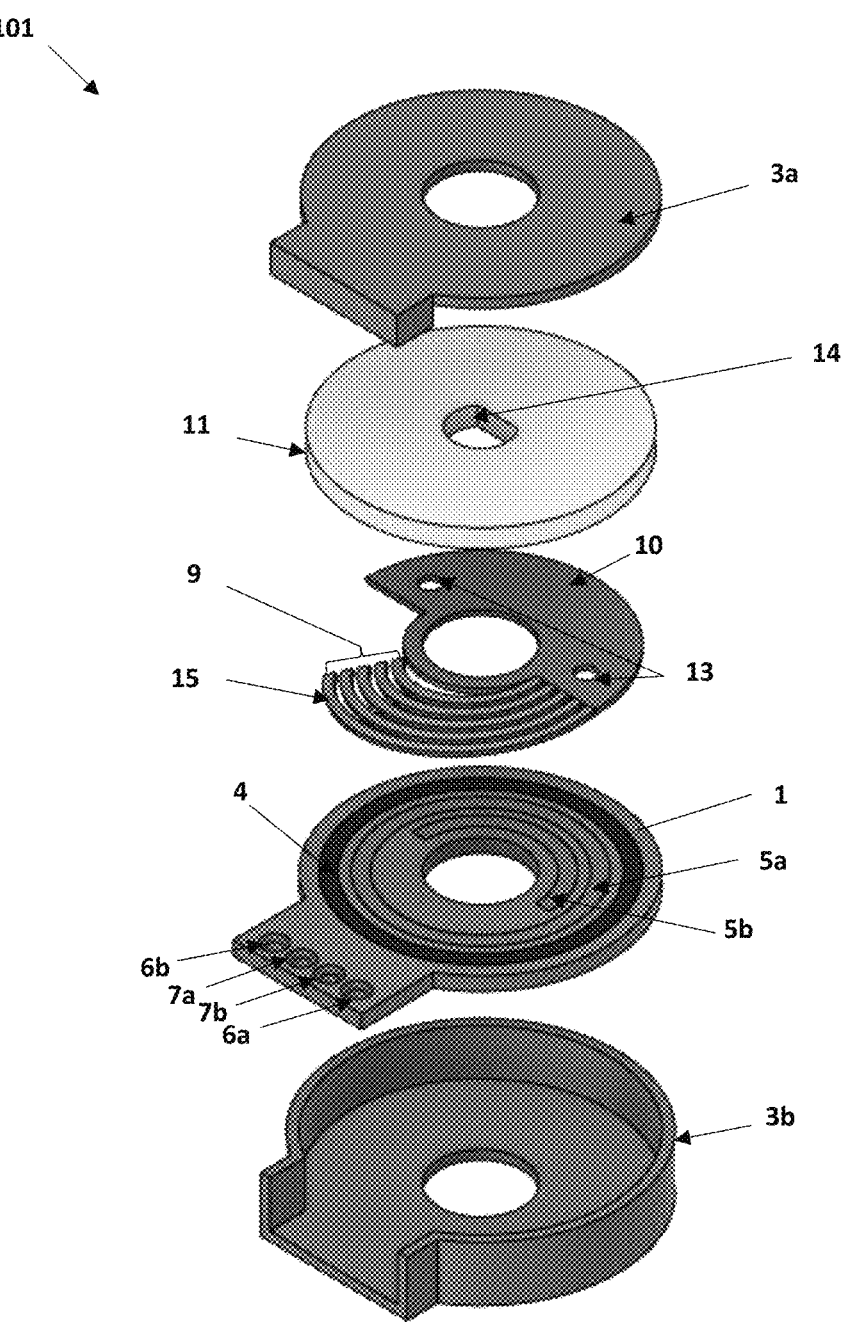
FIG. 1 shows an exploded perspective view of the sensor, from above, with a single sweeper/slide contact, a circular collection path, and a semi-circular collection path according to a first embodiment.

The following descriptions pertain to two embodiments currently envisioned for implementing the present disclosure. It should be noted that this description is not intended to impose limitations but rather serves the purpose of explaining the fundamental principles and characteristics of the present invention. The scope and extent of the present invention should be established by referring to the appended claims. The term integration, used herein, means: mathematically or geometrically combining, unifying, merging, blending, adding, or subtracting two input values to derive an angle.

The two embodiments relate to two rotational angle-detecting sensors 101 (FIGS. 1-6) and 102 (FIGS. 7-16), including the basic elements of a potentiometer. Sensor 101 offers an advantage wherein redundant voltage signals are integrated via a differential amplifier, requiring only one analog pin in order to read the signal. This setup ensures the sensor maintains the same resolution, as a standard potentiometer, while requiring fewer pins compared to previous "switching" methods and techniques. Rotational angle-detection sensor 102, of the second embodiment, utilizes two analog pins and a custom-derived equation to merge the signals, resulting in twice the resolution of a normal potentiometer.

FIGS. 1-6 pertain to the first embodiment, and FIGS. 7-16 pertain to the second embodiment. Both embodiments include a fixed printed circuit board (PCB) 1, a rotating disk 2, and a sensor housing 3. The PCB 1 comprises a circular resistive track 4, communicator tracks 5a, 5b, 5c, input terminals 6a, 6b, and output terminals 7a, 7b, all printed on a ceramic substrate 8. The rotating disk includes a conductive slide contact 9, 9a, 9b, conductive body 10, and plastic disk base 11, 11b. The conductive slide contacts 9, 9a, 9b establish connections between points on the resistive track 4 and communicator tracks 5a, 5b, 5c. The purpose of the sensor housing unit 3 is to keep the slide contacts 9, 9a, 9b concentric with the resistive track 4, ensuring contact with the resistive and the communicator tracks 4, 5a, 5b, 5c, and affixing the sensors 101 and 102 to a body.

Embodiment 1

Figure 1A:
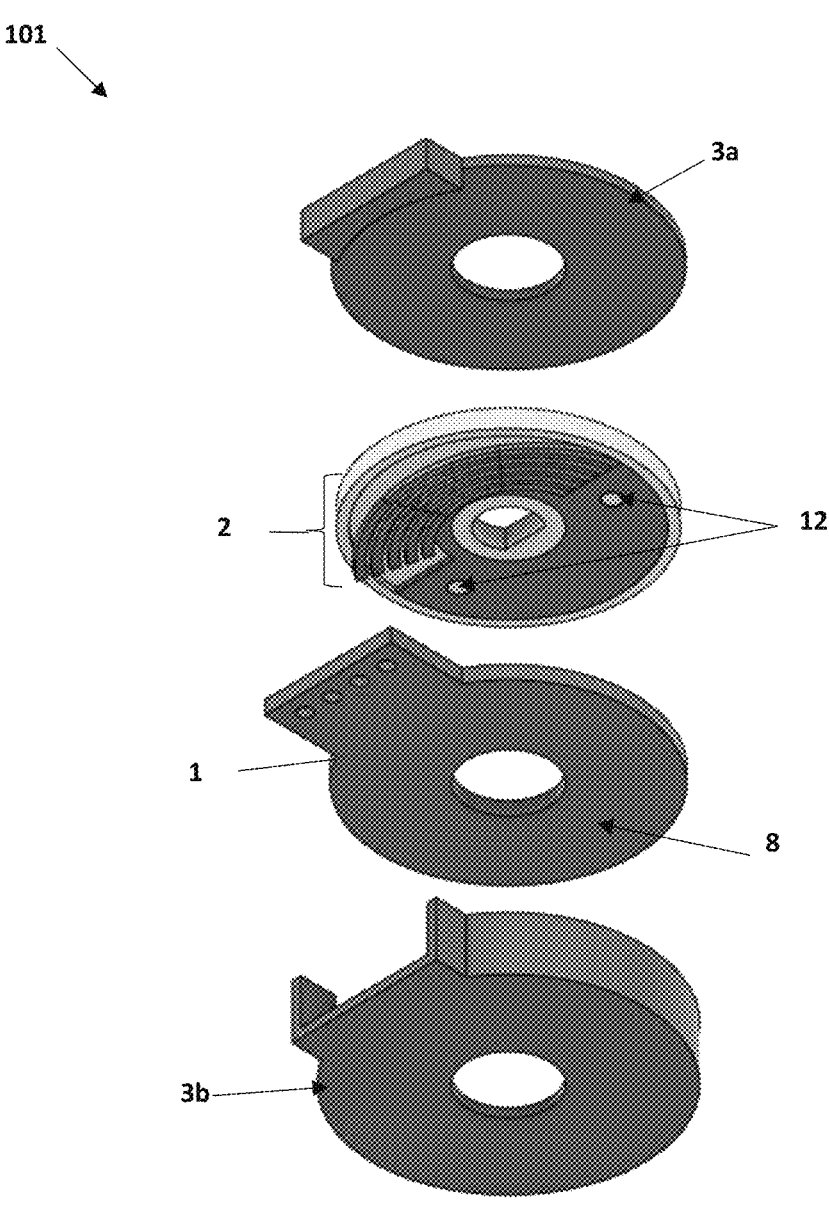
FIG. 1A shows the exploded perspective view of FIG. 1 from a different angle.
Figure 2:
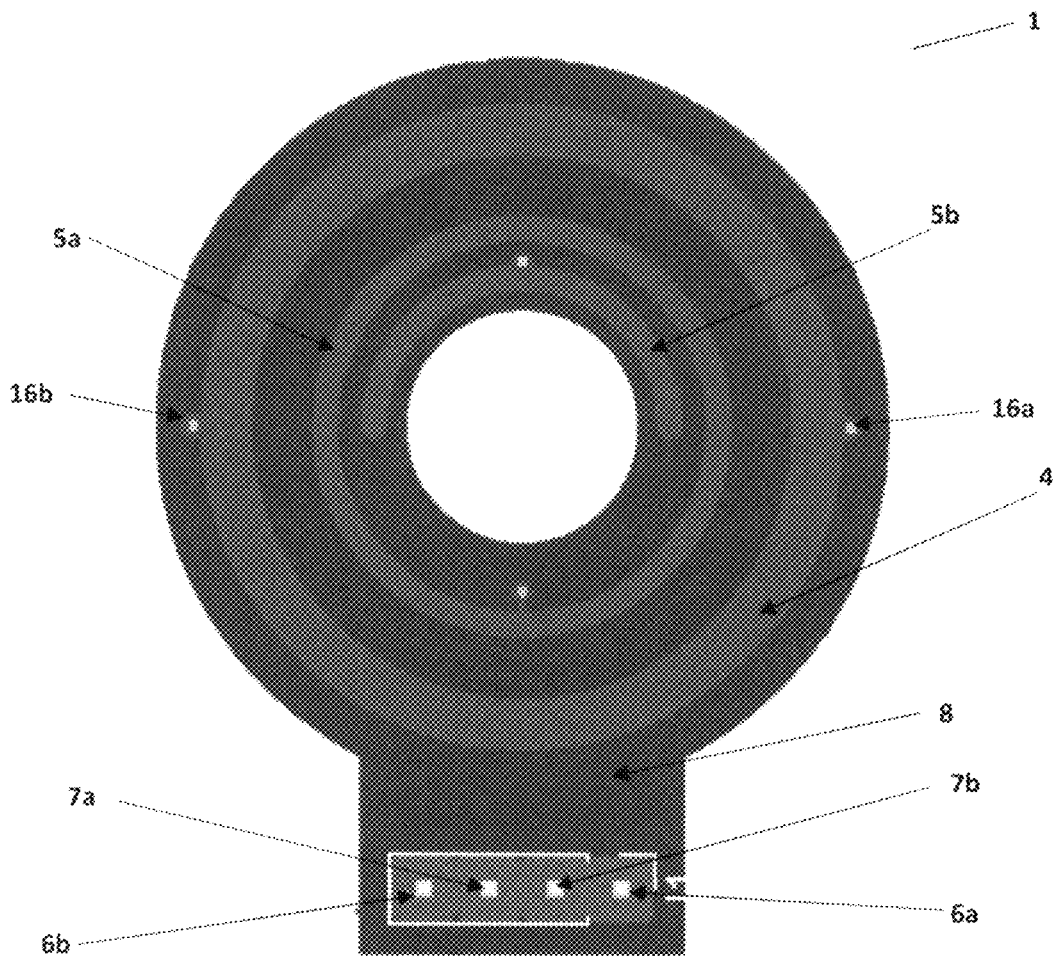
FIG. 2 shows a top plan view of the fixed printed circuit board (PCB) of FIG. 1.
Figure 3:
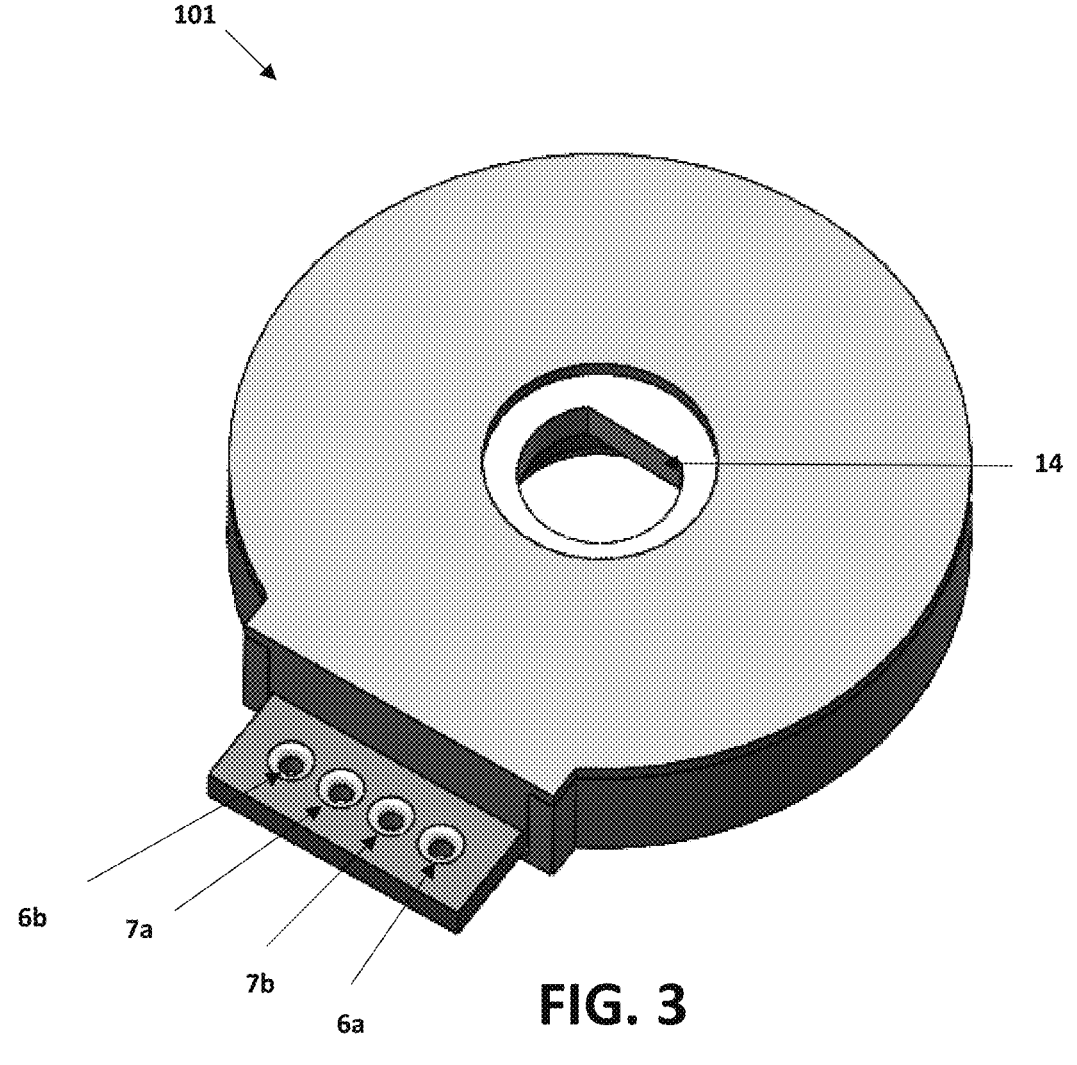
FIG. 3 is a perspective view illustrating the overall design of the fully assembled sensor according to the first embodiment.

As illustrated in FIGS. 1-3, stationary components include the PCB 1, a sensor housing cover 3a, the ceramic substrate 8, and sensor housing base 3b. The housing base 3b can be fixed to a motor body or solid surface to prevent rotation thereof. The dynamic component is the rotating disk 2 and its subcomponents which are fixed to a motor shaft or a rotable dial. To interface the rotating disk 2 to a motor shaft, a "D" shaped hole 14 is designed in the center of the plastic disk base 11. The motor shaft will have a corresponding "D" shaped shaft design which mates with the "D" shaped hole 14 of the rotating disk 2. The plastic disk base 11 aligns and supports the conductive body 10 with plastic extrusion posts 12, formed on an under surface thereof (see FIGS. 1 and 1A), match or mate with alignment holes 13 formed on the conductive body 10. The conductive body 10 connects and supports a plurality of or several metal contact flexures 15 that make up the conductive slide (wiper) contact 9. The conductive body 10 and slide (wiper) contact wipers 9 are made by cutting and bending a metal shim, in a conventional manner. Multiple metal flexures 15 are cut to make the conductive slide contact 9, increasing the number of contact points on the resistive track 4 and the first and the second communicator tracks 5a and 5b. It is to be appreciated that more contact points are an inexpensive way to reduce the error of the rotational angle-detection sensor 101.

According to the design, 5 metal flexures 15 are used so the resistive track 4 and the first and second communicator tracks 5a and 5b each have at least one flexure fully contacting the track and another partial contact point, ensuring sufficient contact without tight tolerances being required.

When power is supplied to the angular sensor in the first embodiment, the current flows from the input terminal "vin" 6*a* through an electrical conduit or path (not shown in detail) formed inside the PCB 1 to a conductive point 16*a*, located on one side of the resistive track 4 (see FIG. 2) but in electrical contact with the resistive track 4. Subsequently, the current flows along both arcuate segments of the circular resistive track 4 to reach conductive point 16*b*, located on the other side of the resistive track 4. The conductive point 16*b* is connected to both the resistive track 4 and the ground terminal 6*b* by an electrical conduit or path (not shown in detail). Both halves of the resistive track are identical to one another. The resistive track linearly decreases the voltage from the value provided by the input terminal 6*a*, e.g., 5V, to 0V provided by the ground terminal 6*b*. For an Arduino Uno, the input voltage is 5V. The conductive slide contact 9 continuously connects a point along the circular resistive track 4 to an associated point along the circular communicator track 5*a*. The communicator track 5*a* is connected to the output terminal "v1" 7*a* through an internal conduit or path in the PCB 1, not shown in detail. The second communicator track 5*b* is a semi-circle, i.e., an arc extending 180 degrees, and thus the conductive slide contact 9 only contacts the second communicator track 5*b* during one-half of the rotation of the plastic disk base 11 relative to the resistive track 4. When the conductive slide contact 9 is in contact with the second communicator track 5*b*, current travels from an associated point on the resistive track 4, through the slide contact 9 to the communicator track 5*b*. The communicator track 5*b* is connected to output terminal "v2" 7*b* through an internal conduit or path in the PCB 1, not shown in detail. Therefore, the output terminal "v2" 7*b* will have the same value as output terminal "v1" 7*a* for a first half of the resistive path 4, but no voltage reading for "v2" 7*b* during the second half of rotation of the plastic disk base 11 relative to the resistive track 4.

Figure 4:
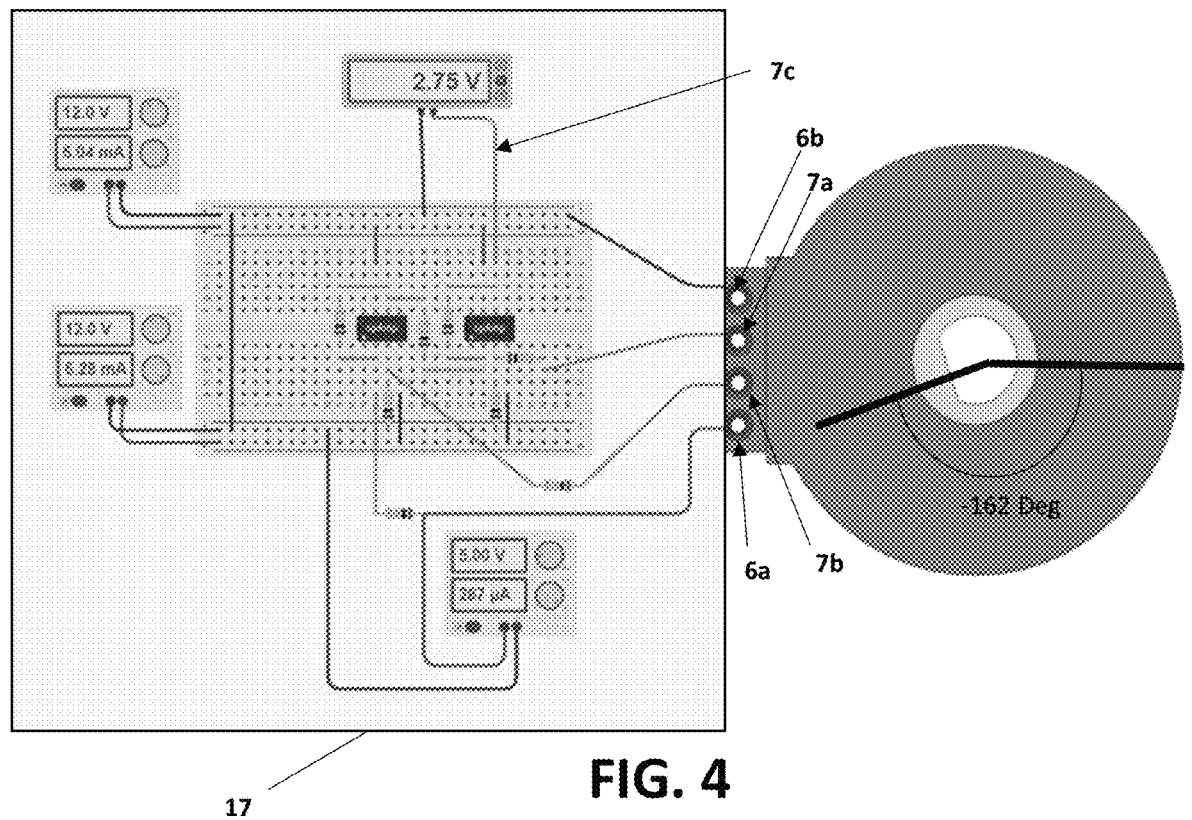
FIG. 4 is a top plan view that illustrates the use of the fully assembled sensor of FIG. 3 connected to a differential amplifier circuit used to combine two analog signals "v1" and "v2" into a single output "v3".
Figure 5:
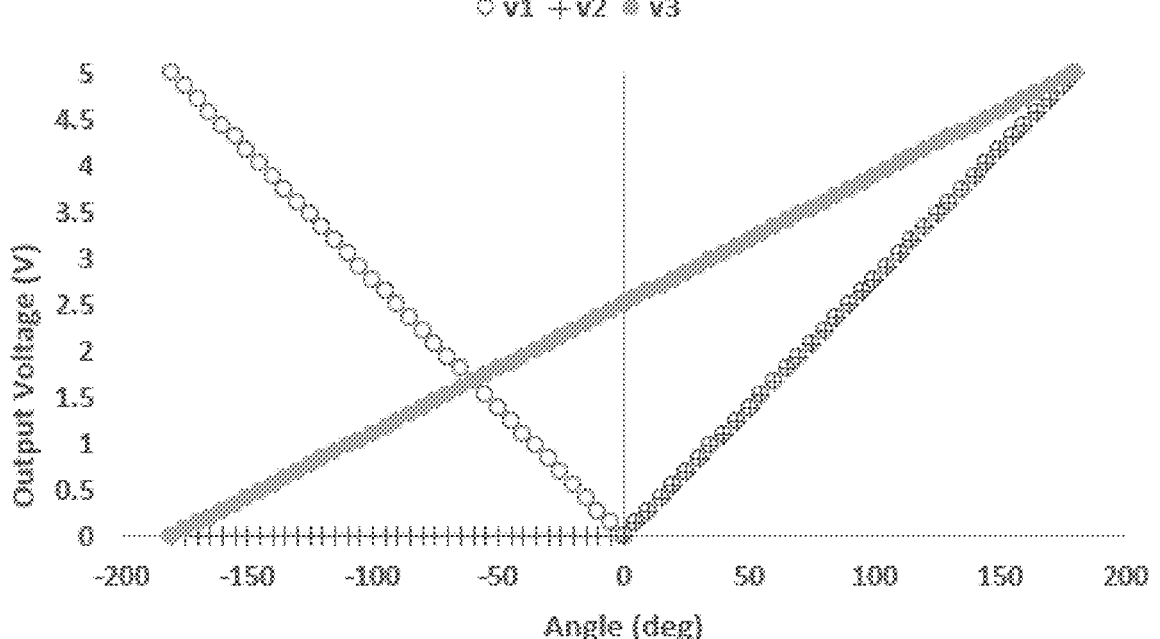
FIG. 5 is a graph which demonstrates the expected voltage output of "v1", "v2", and "v3" from FIG. 4 when the potentiometer is rotated for a continuous 360 degrees in one rotational direction.
Figure 6:
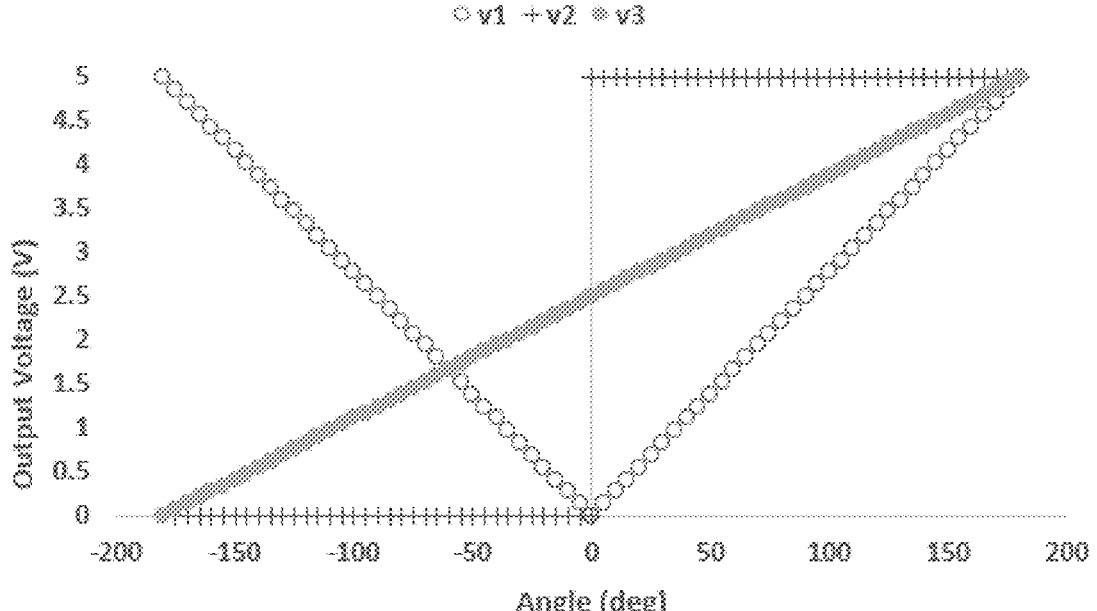
FIG. 6 is a graph which demonstrates the expected voltage output for the sensor in FIG. 3 when "v2" is a binary output and "v1" remains analog; the binary output is a product of conductivity between "v1" and "v2".
Figure 7:
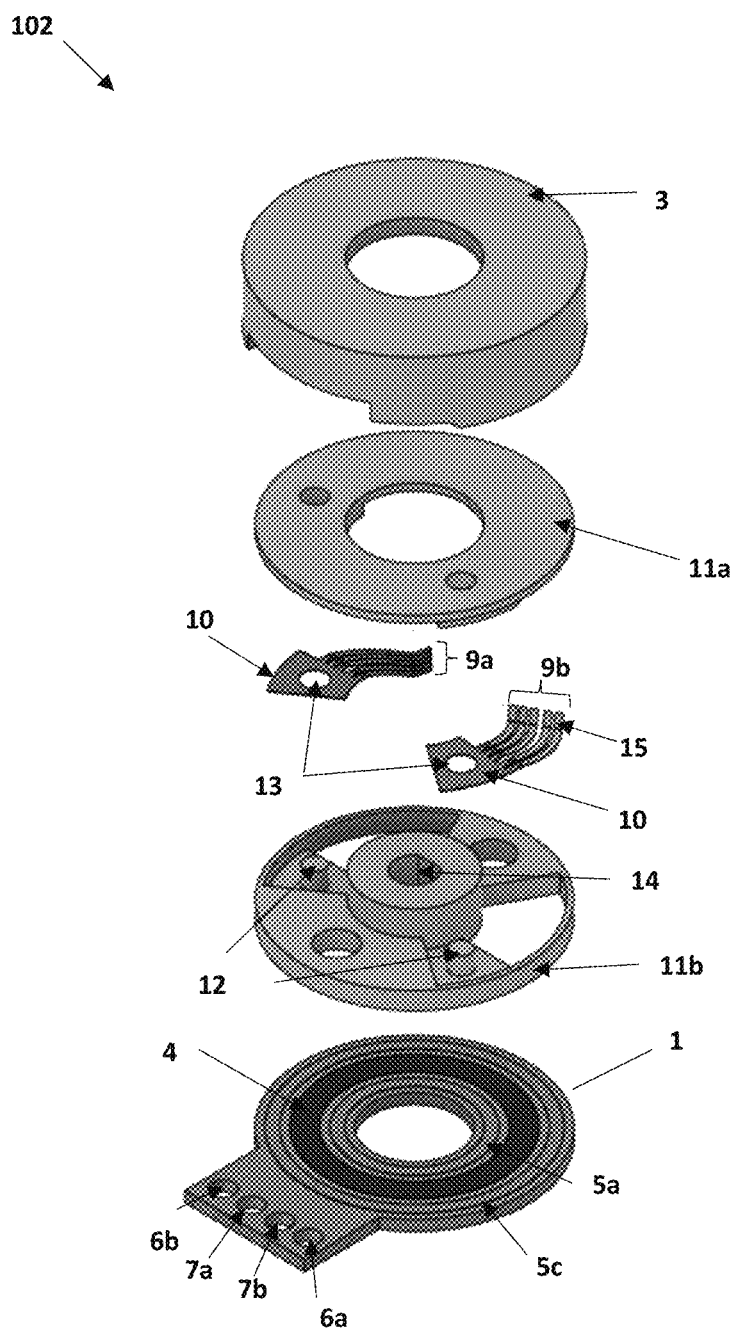
FIG. 7 is an exploded perspective view of the sensor, from above, with dual sweepers offset by 90 degrees and two collection paths according to a second embodiment.
Figure 7A:
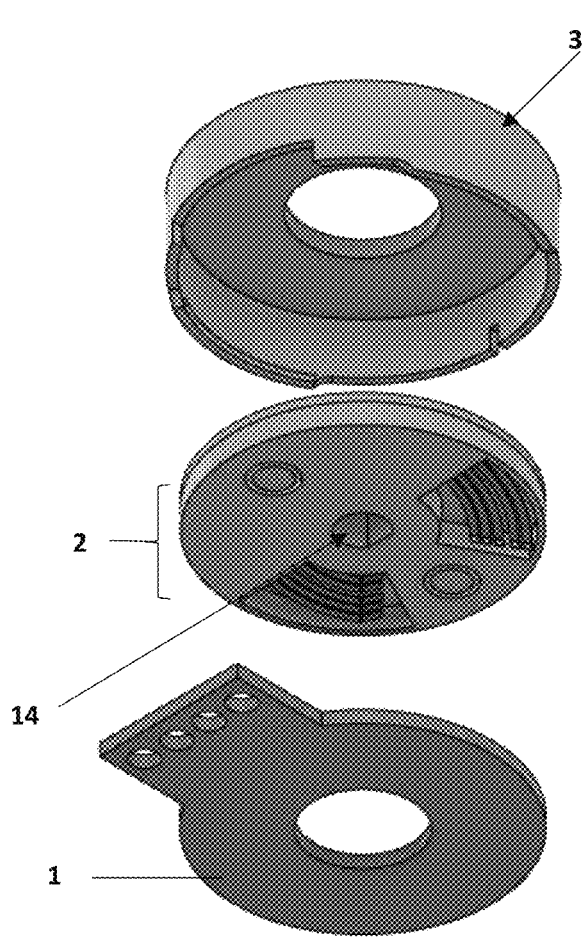
FIG. 7A shows the exploded perspective view of FIG. 7 from a different angle.
Figure 8:
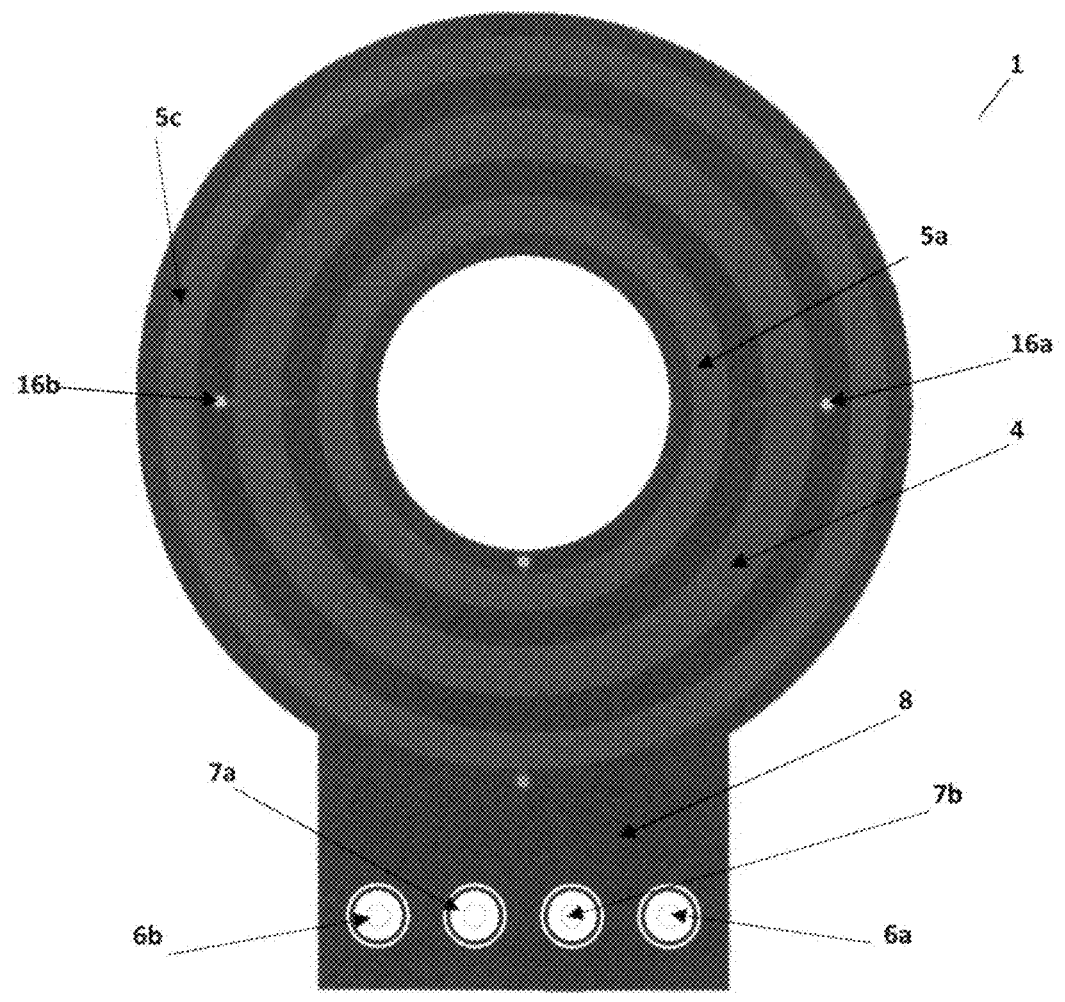
FIG. 8 shows a top plan view of the PCB of FIG. 7.
Figure 9:
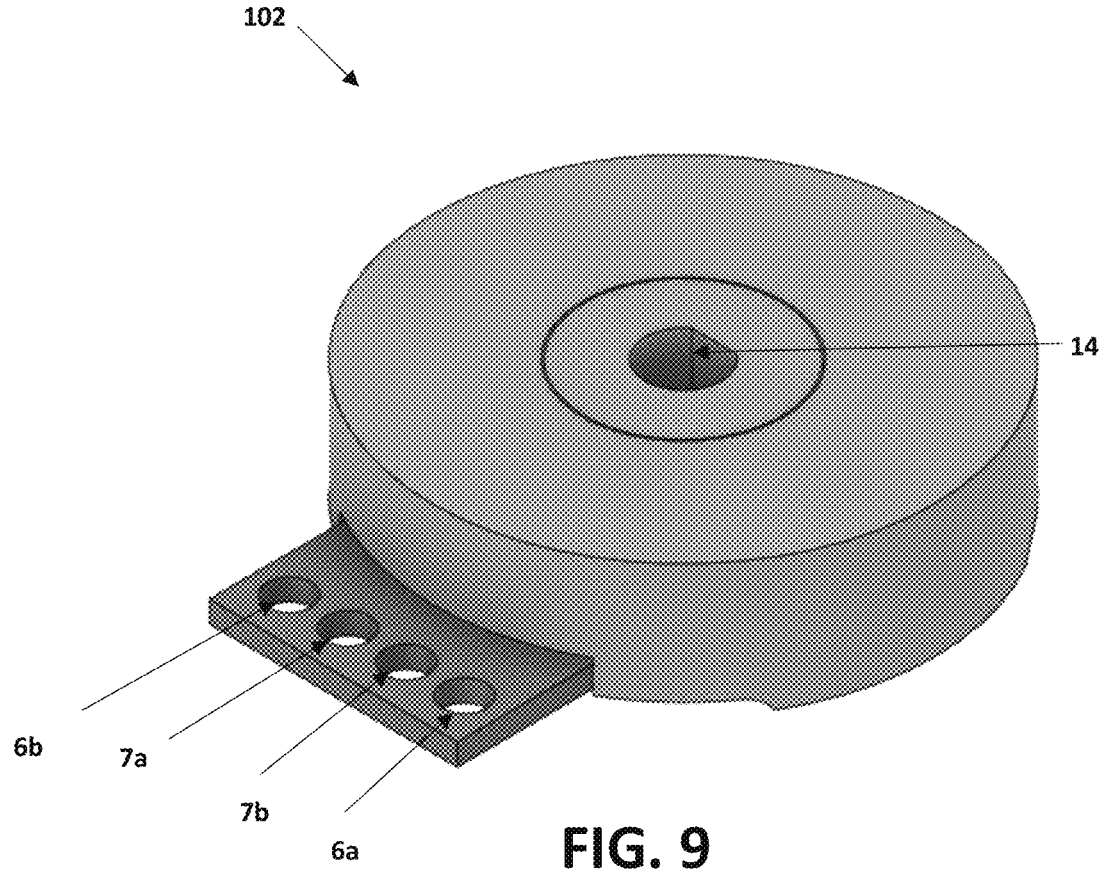
FIG. 9 is a perspective view illustrating the overall design of the fully assembled sensor according to the second embodiment.

In FIG. 4, it can be seen that the two output voltages are combined with one another into a single value labeled "v3" 7*c*, using a custom differential amplifier circuit 17. A differential amplifier circuit uses op-amps and specific resistors to combine or subtract the two output voltages. By combining the two output voltages into a single value, fewer pins are taken up on a microcontroller used to read the angular sensor. One example of a microcontroller is Arduino Uno, which has 6 pins that can be used to read voltage signals from 0 to 5V. The inputs and outputs of the custom differential amplifier circuit 17 can be expressed by equation 1 below:

$$v_3 = v_2 - \frac{v_1}{2} + \frac{v_{in}}{2}$$

where the inputs to circuit 17 are "v1" 7*a*, "v2" 7*b*, and voltage input "vin" 6*a*, and the output is "v3" 7*c*. Voltage output for one rotation of the plastic disk base 11 of the sensor is plotted in FIG. 5. In the figure, the conductive slide contact 9 starts at 5V which is located at conductive point 16*a*. As the plastic disk base 11 and the slide contact 9 rotates around the resistive track 4, the voltage reading "v1" decreases linearly until it reaches the conductive point 16*b*. At this point, the slide contact 9 now commences engaging with the semi-circular communicator track 5*b* while still remaining in contact with the circular communicator track 5*a*, now outputting the same signal for both "v1" and "v2".

For multiple rotations, the output voltage "v1" creates a triangular waveform, and the output voltage "v2" creates a ramp function. These two signals are combined by the differential amplifier circuit 17 to create output voltage "v3", which is a continuous linear voltage response around the resistive track 4. Output voltage "v3" is proportional to the angle of the sensor and can be converted directly to degrees. Similarly, output voltage "v2" can instead be used to create a step input by observing the connection between output voltage "v1" and "v2". This binary value provided from "v2" can be measured on a digital pin on a microcontroller and combined with output voltage "v1" to create the same linear response "v3". This voltage response is demonstrated in FIG. 6.

Embodiment 2

Figure 10:
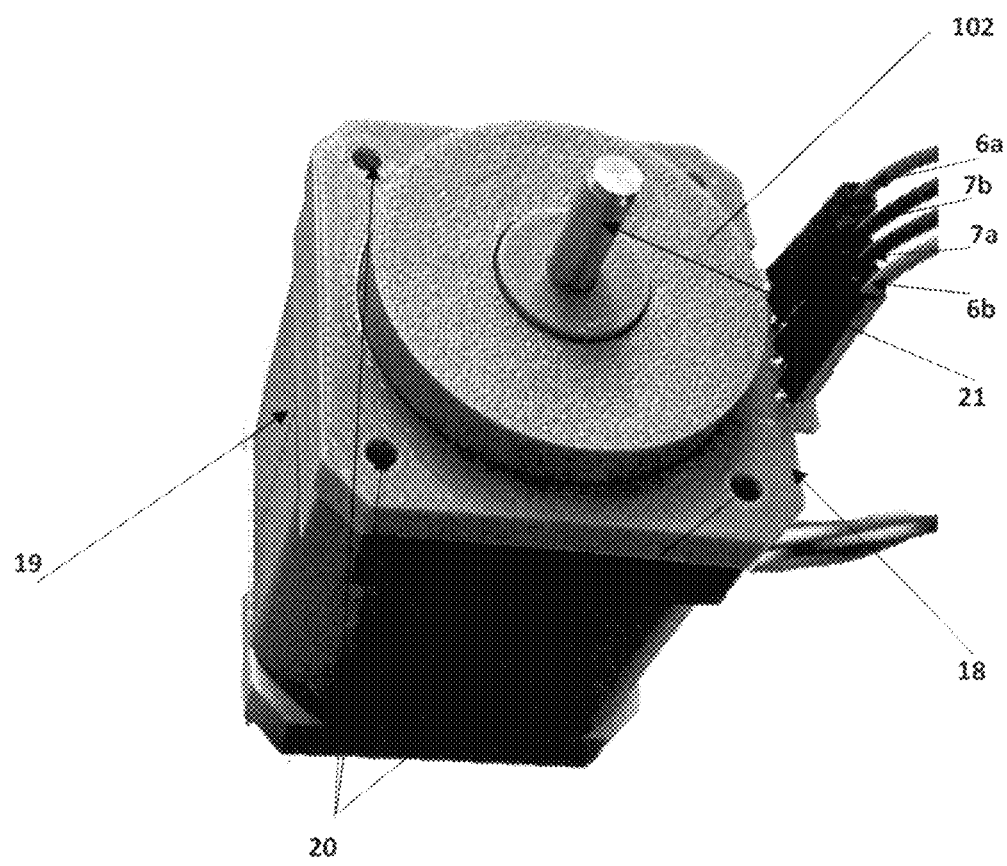
FIG. 10 is a perspective view which illustrates the fully assembled sensor, of the second embodiment, attached to a stepper motor via a mount/coupler fixture, which was the setup used to collect experimental data, discussed below.

In FIGS. 7-10, the stationary components are the PCB 1, the sensor housing 3, the sensor motor coupler 18, and the stepper motor 19. The sensor motor coupler 18, shown in FIG. 10, is bolted to the stepper motor via a plurality of bolts (not shown in detail) engaging with a respective one of the bolt holes 20. A bottom portion of the sensor housing 3 is typically press-fit into and affixed within a recess (not shown in detail) formed in the sensor motor coupler 18. The dynamic component is the rotating disk 2, which interfaces to the motor shaft 21 via the "D" shaped hole 14. As noted above, the motor shaft will have a corresponding "D" shaped shaft design which mates with the "D" shaped hole 14 of the rotating disk 2. The rotating disk 2 supports a conductive body which comprises a pair of slide contacts 9*a* and 9*b* so that they extend from the undersurface thereof and engage with the resistive track 4, the inner communicator track 5*a*, and the outer communicator track 5*c*. The slide contacts 9*a* and 9*b* are offset from one another by 90 degrees and engage with plastic extrusion posts 12 formed in the plastic disk base 11*b* to secure the pair of slide contacts 9*a* and 9*b* to the plastic disk base 11*b*, via a pair of alignment holes 13. The plastic disk top 11*a* and plastic disk bottom 11*b* sandwich the conductive bodies 10 therebetween to keep them in place. Similar to the first embodiment, a plurality of or several metal contact flexures 15 are used to create the conductive slide contacts 9*a* and 9*b* and ensure desired contact with the resistive track 4, the inner communicator track 5*a*, and the outer communicator track 5*c*, during operation.

Figure 11:
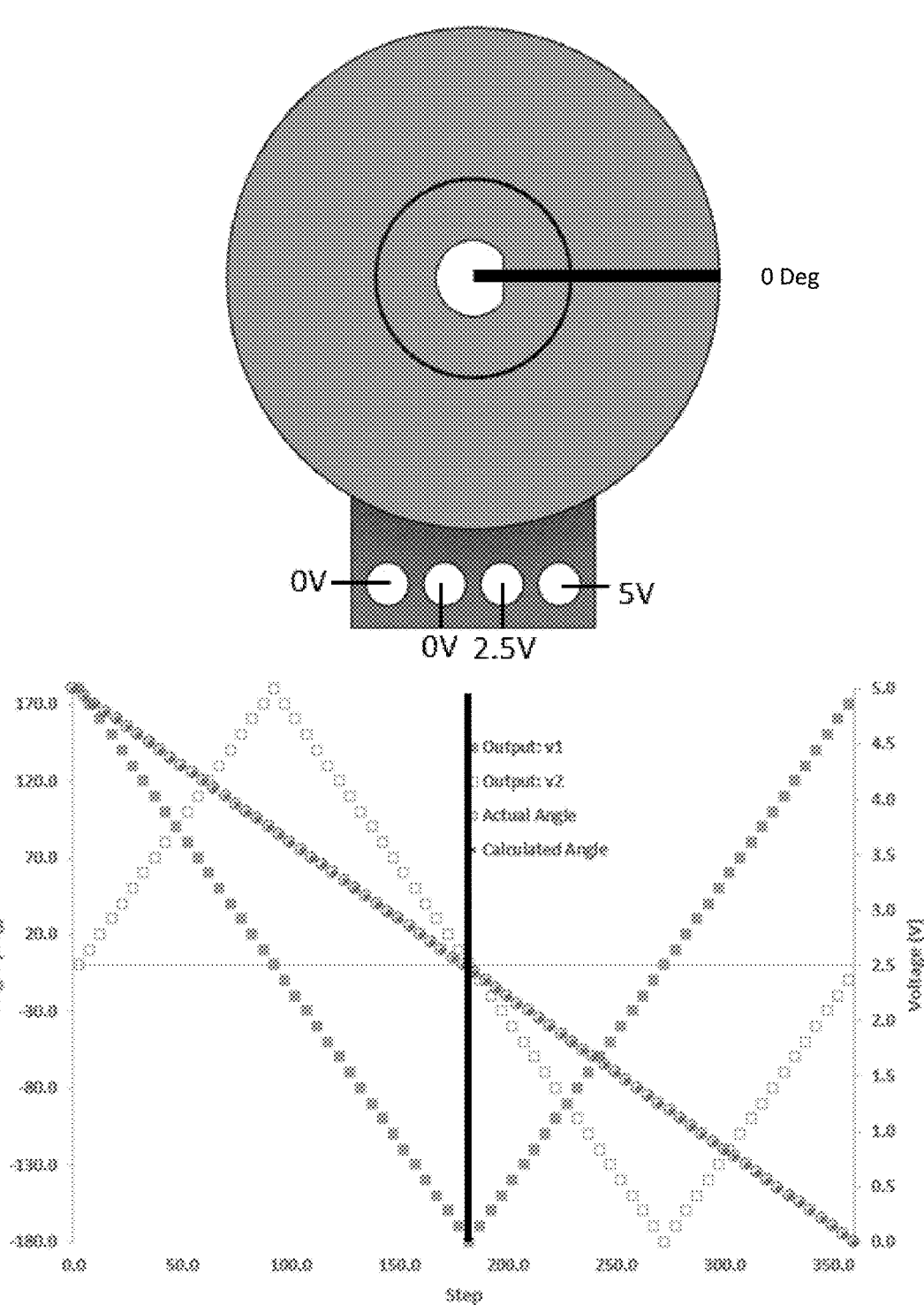
FIG. 11 demonstrates the sensor outputs of the second embodiment at an angle of 0 degrees and the combined signal used to record angular position.
Figure 11A:
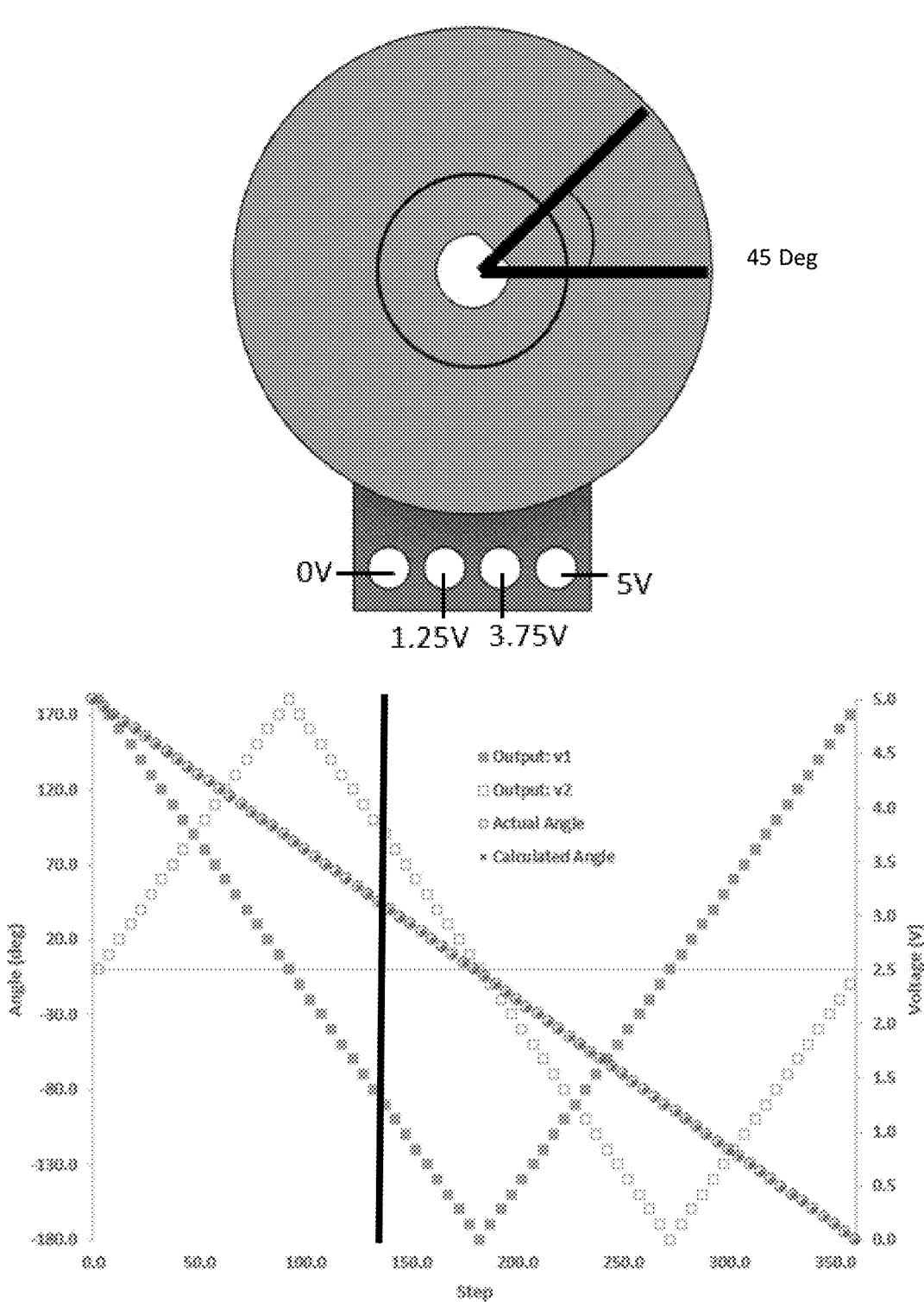
FIG. 11A demonstrates the sensor outputs of the second embodiment at an angle of 45 degrees and the combined signal used to record angular position.
Figure 11B:
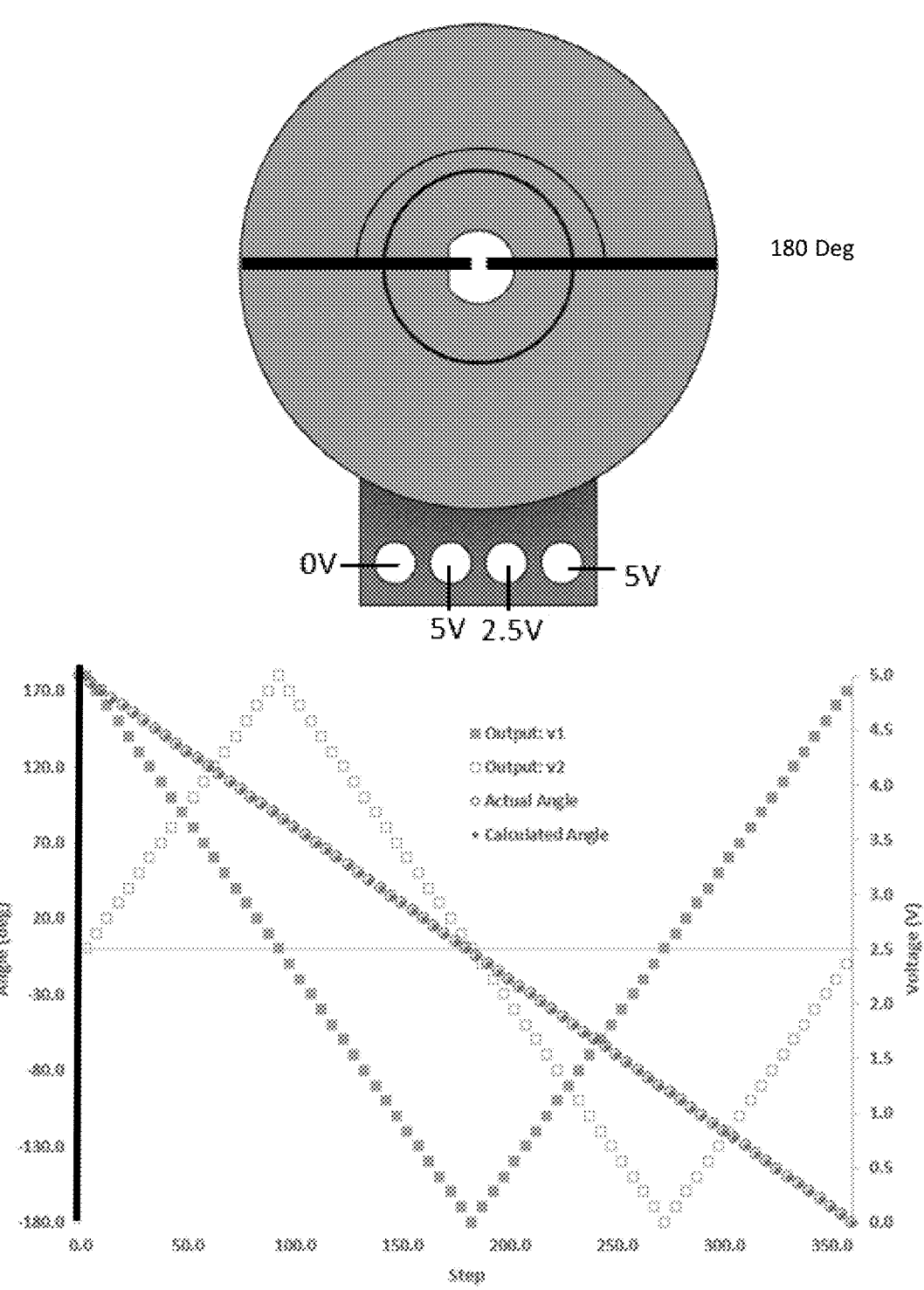
FIG. 11B demonstrates the sensor outputs of the second embodiment at an angle of 180 degrees and the combined signal used to record angular position.
Figure 11C:
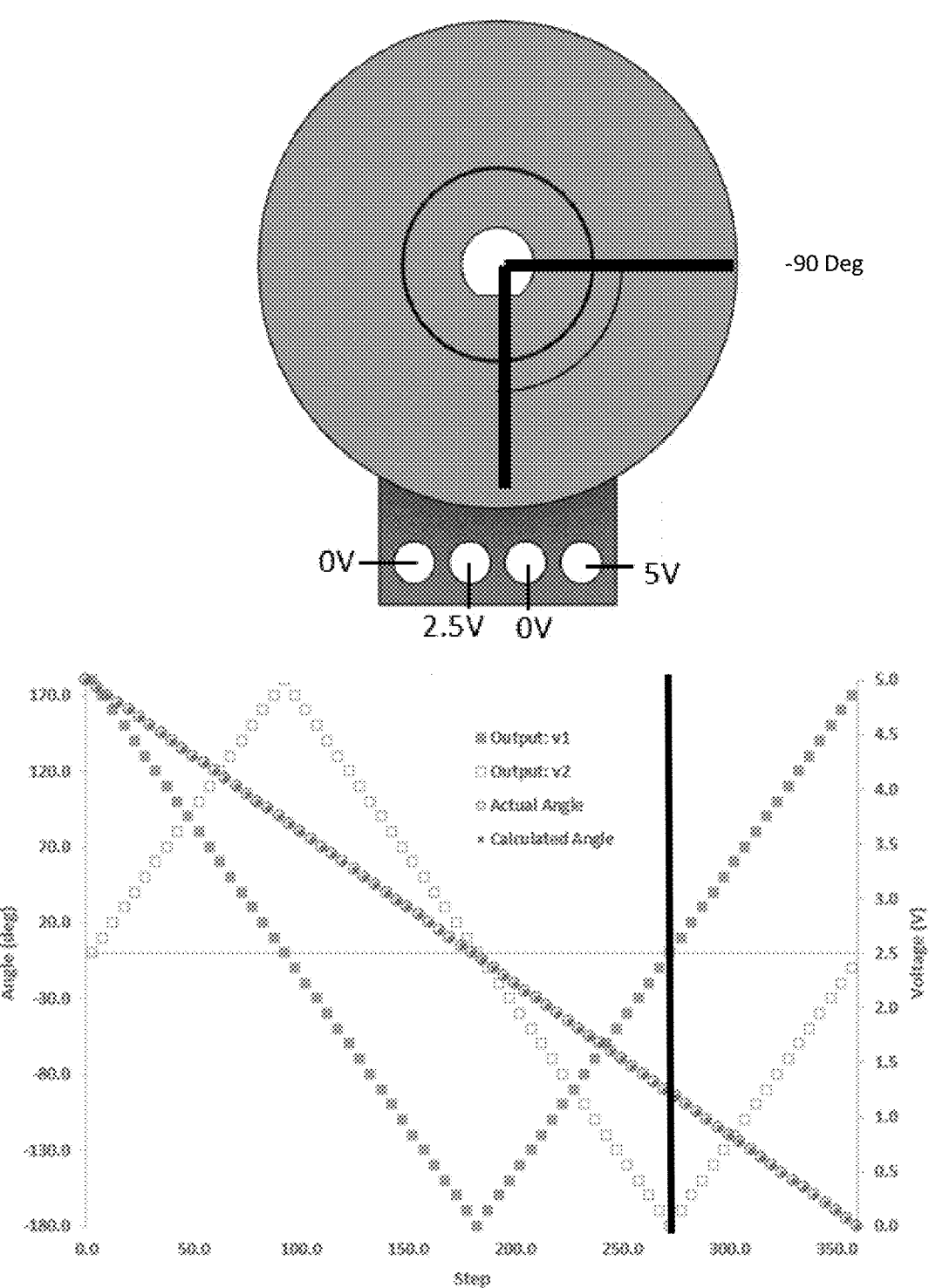
FIG. 11C demonstrates the sensor outputs of the second embodiment at an angle of –90 degrees and the combined signal used to record angular position.

In the same manner as the first embodiment, when power is supplied to the sensor, the current travels from the input terminal 6*a*, through a conduit or path formed inside the PCB 1, to a conductive point 16*a* located on one side of the resistive track 4, which is also in electrical contact with the resistive track 4. The current then flows through both arcs of the circular resistive track 4 to the other conductive point 16*b*, located on the opposite side of the resistive track 4, which is connected to the ground terminal 6*b* through the PCB 1 by an internal electrical conduit or path (not shown in detail) formed inside the PCB 1. The first conductive slide contact 9*a* establishes a connection between the inner communicator track 5*a* and a specific point along the resistive track 4. Conversely, the second conductive slide contact 9*b* is positioned at a location which is 90-degree offset from the first slide contact 9*a* and electrically connects the outer communicator track 5*c* to a different point along the resistive track 4. The first and second slide contacts 9*a* and 9*b* electrically connect points on the resistive track 4 to the communicator tracks 5*a* and 5*c*. The inner communicator track 5*a* is connected to the output terminal "v1" 7*a* while the outer communicator track 5*c* is connected to output terminal "v2" 7b, through internal conduit or wiring (not shown in detail) formed within the PCB 1. Therefore, the redundant analog readings "v1" 7a and "v2" 7b are electrically attached to two independent varying points that are 90-degrees offset along the resistive path 4. The two redundant analog readings from "v1" and "v2" create two triangular waves when plotted in FIGS. 11-11C, 15, and 16. These triangular waves are integrated with the custom-derived equation 2 below:

$$\theta = \arctan 2\left(\sin\left(\frac{\pi * V_2}{V_{in}} - \frac{\pi}{2}\right), \sin\left(\frac{\pi * V_1}{V_{in}} - \frac{\pi}{2}\right)\right)$$

where θ is the sensor angle in units of radians. This custom-derived equation utilizes both signals from the output voltage instead of switching between them, doubling the resolution. FIG. 11 presents the theoretical output values for "v1" and "v2" as well as the calculated angle and actual angle plotted as a stepper motor 19 rotates the sensor from 180 degrees to −180 degrees, for example. The actual and calculated angles are plotted on the left Y-axis and measured in degrees. The output voltages "v1" and "v2" are plotted on the right Y-axis and measured in volts (V). The X-axis is the number of steps taken by the stepper motor during rotation. In this theoretical example, the stepper motor rotates one degree for each step. The output voltages "v1" and "v2" create a triangular wave. The angle calculated with equation 2 above matches the actual angle identically.

Experimental data was collected to test the accuracy of a rotational angle-detecting sensor 102 prototype. The sensor 102 was press-fit into the sensor motor coupler 18 and mounted to a stepper motor 19, as generally shown in FIG. 10. The actual angle of the motor shaft 21 was measured by determining the number of steps taken by the stepper motor 19. At each step, the sensor 102 recorded the output voltage "v1" 7a and "v2" 7b and calculated the angle. The software code used to calculate the sensor 102 angle is presented in FIG. 12 and results are plotted in FIG. 15. The calculated angle had an average error of 0.75% compared to the actual angle of the stepper motor shaft.

Figure 16:
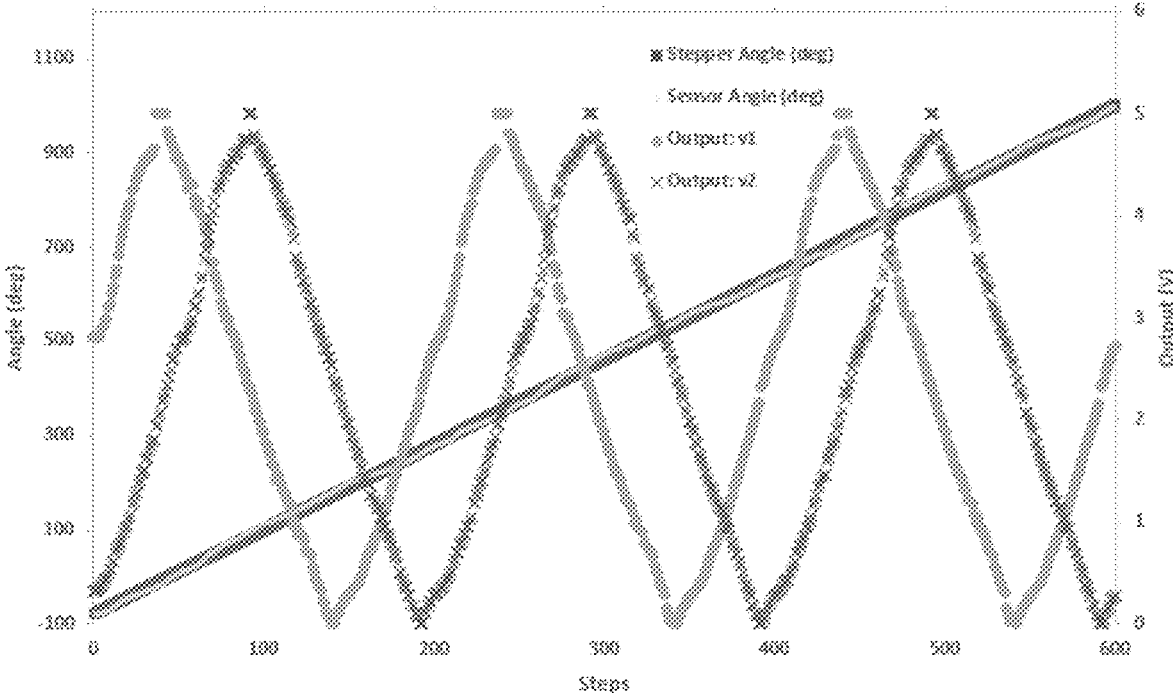
FIG. 16 is a graph which demonstrates the real voltage output for v1 and v2, and the combined angular measurement compared to the actual angular value when the sensor is continuously rotated for three complete rotations; the number of steps for a full rotation is set to 200.

In another experimental setup, a modification was made to the code shown in FIG. 12. The modification also counted the number of full rotations, enabling the calculated angle to increase indefinitely instead of a continuous angular value from −180 to 180 degrees. The modified code is presented in FIG. 13. The experimental results are shown in FIG. 16. The calculated angle started at approximately −100 degrees, then rotated for three full rotations until it ended at approximately 980 degrees. Almost all errors in the calculated angle are due to the resolution of the resistive track 4.

Figure 14:
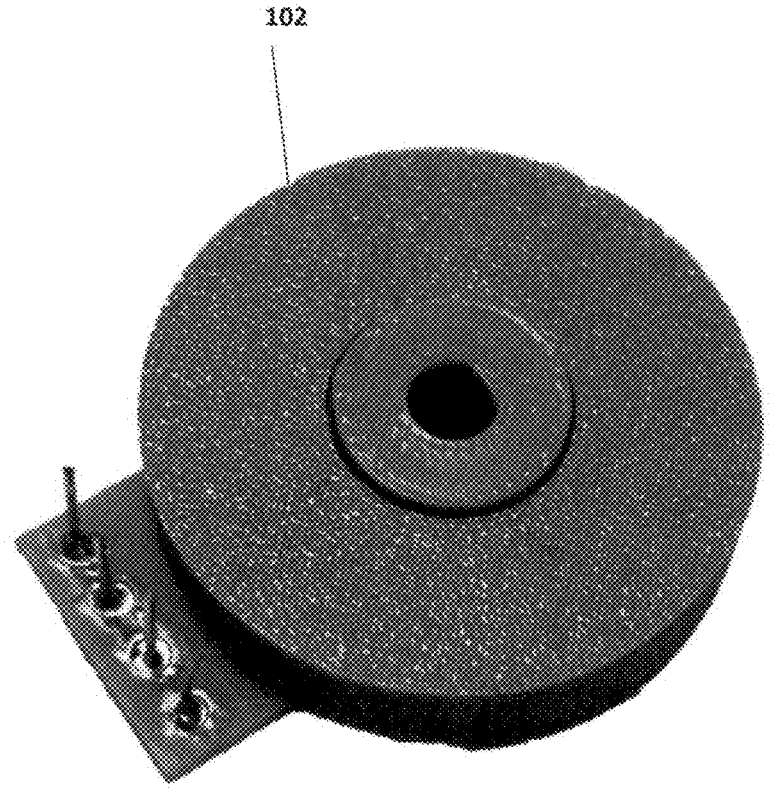
FIG. 14 is a perspective view showing the physical model of the sensor illustrated in FIGS. 7-9 according to the second embodiment.
Figure 14A:
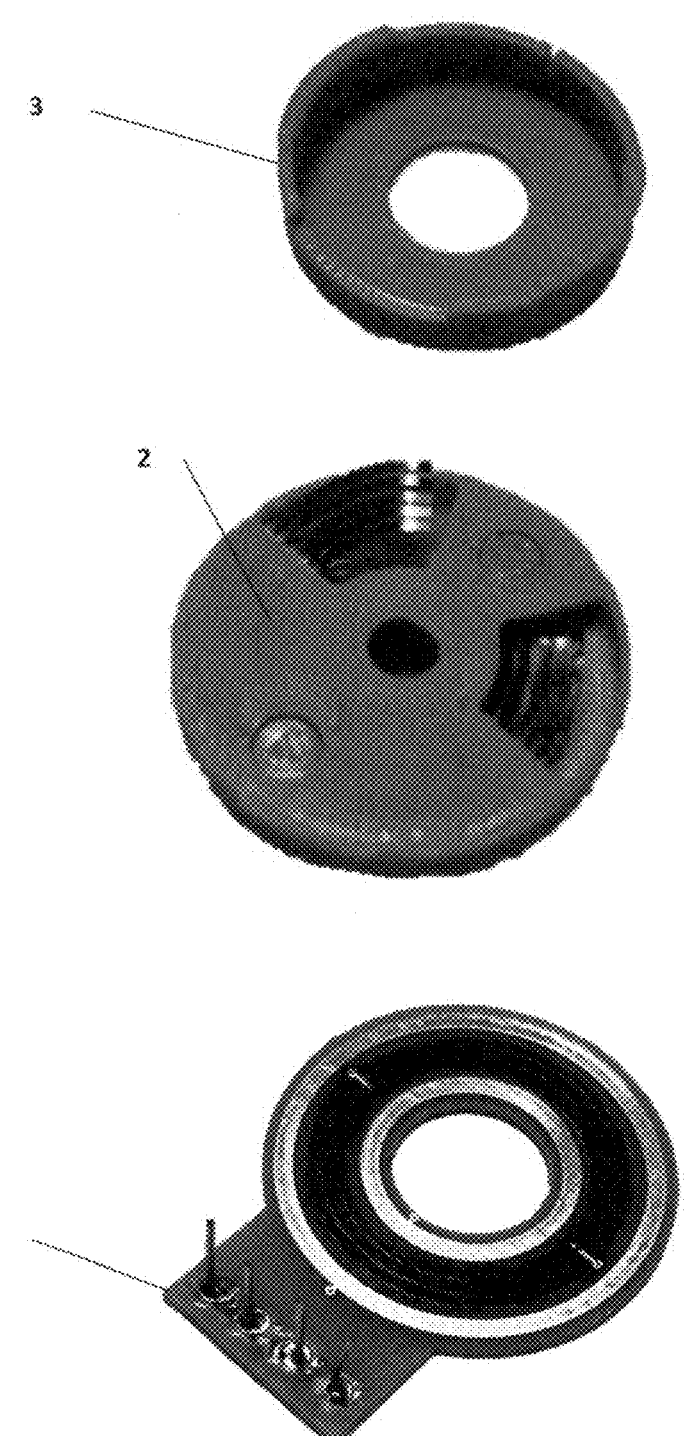
FIG. 14A presents the individual components of the physical model shown in FIG. 14, prior to assembly.
Figure 15:
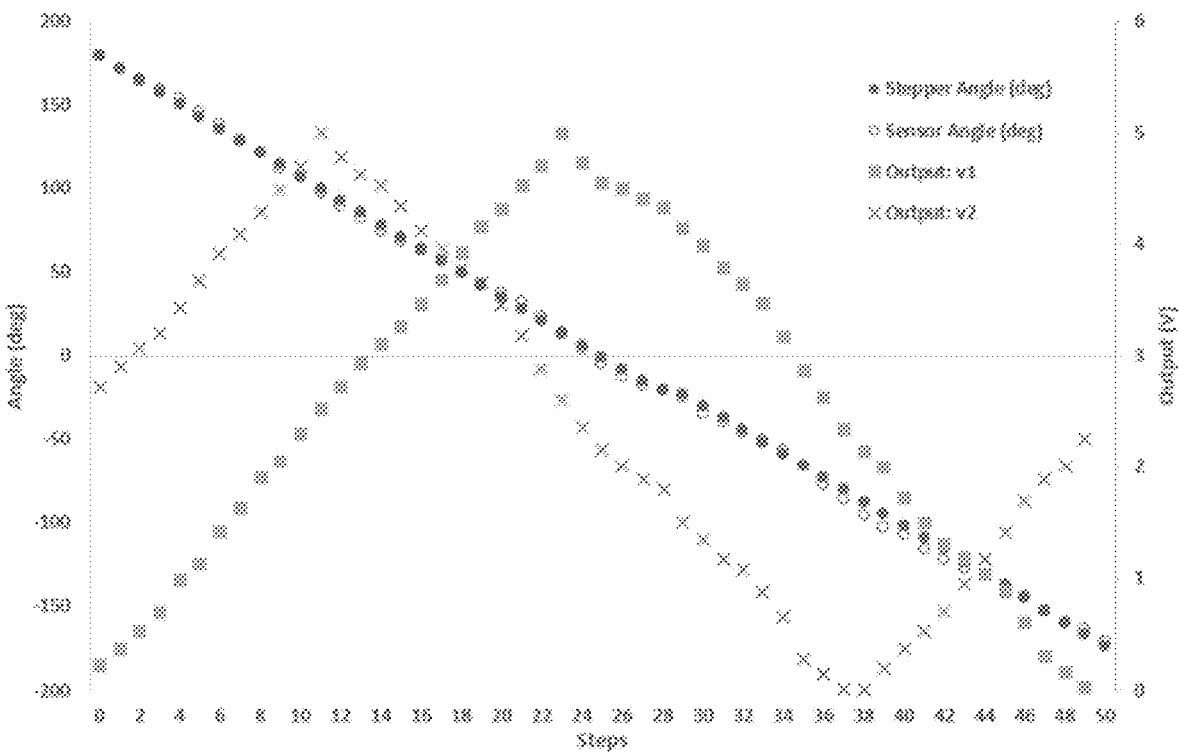
FIG. 15 is a graph which demonstrates the real voltage output for v1 and v2, and the combined angular measurement compared to the actual angular value from 180 to –180 degrees; the number of steps for a full rotation is set to 50.

The sensor 102 prototype is shown in FIGS. 14 and 14A. In this model, the resistive track 4 was painted by hand on ceramic substrate 8, unlike typical silkscreen methods. Because the resistive track 4 is hand-painted, there were several defects. These defects are illustrated in FIG. 16. For each oscillation of the triangular waves, repeated errors can be seen. It is believed that the use of silk-screening methods would drastically reduce errors in the prototype sensor 102. The defects have a smaller impact on the calculated angle compared to what would be seen in a sensor that switches between values. Equation 2 reduces the error by combining the signal outputs so a large error, in one of the output voltages, is filtered out. A typical potentiometer, with a resistive track applied by silk screening methods, will have a resolution of about 0.02%. Other physical modifications increase the accuracy of the sensor, such as the use of multiple flexures 15 on both slide contacts 9a and 9b to increase the number of contact points between the resistive track 4 and communicator tracks 5a and 5c.

Both embodiments of the rotational angle-detecting sensor present innovative approaches to angle measurement, with each offering distinct advantages. The first embodiment streamlines the signal processing by combining redundant voltage signals, maintaining resolution while reducing pin usage on microcontrollers. In contrast, the second embodiment utilizes a custom-derived equation to directly calculate the angle, effectively doubling resolution compared to standard potentiometers. Despite differences in methodology, both embodiments share a common structural foundation, ensuring precise contact and alignment between components. Experimental validation confirms the effectiveness of both designs, demonstrating minimal error rates. This substantiates the versatility and accuracy of the rotational angle-detecting sensor, showcasing its potential for significant advancements in various applications that demand precise angle measurements for limited cost.

What is claimed:

1. A rotational angle-detection sensor for measuring an angle of rotation of a shaft relative to a sensor housing, and the rotational angle-detection sensor comprising:
   the sensor housing accommodating a printed circuit board (PCB);
   the printed circuit board (PCB) supporting:
   an electrical input, a ground and first and second electrical outputs,
   a continuous circular resistive track electrically connected to the electrical input and to the ground,
   a first communicator track being connected with the first electrical output, and
   a second communicator track being connected with the second electrical output;
   a rotating disk being accommodated within the sensor housing and designed to engage with and be rotated by a motor shaft, and the rotating disk supporting a conductive body for electrically engaging with the continuous circular resistive track and the first and the second communicator tracks;
   wherein a surface of the printed circuit board, facing the rotating disk, supports the continuous circular resistive track, the first communicator track and the second communicator track,
   the conductive body faces the continuous circular resistive track, the first communicator track and the second communicator track, and
   the angle of rotation of the shaft, relative to the sensor housing, being measured by integrating the first electrical output and the second electrical output with one another.

2. The rotational angle-detection sensor according to claim 1, wherein the continuous circular resistive track, the first communicator track and the second communicator track all lie in a plane on the printed circuit board.

3. The rotational angle-detection sensor according to claim 1, wherein the rotating disk has a "D" shaped opening which is designed to engage with one of a rotation shaft or a rotatable dial.

4. The rotational angle-detection sensor according to claim 1, wherein a base of the rotating disk has at least one post that mates with alignment holes formed in the conductive body.

5. The rotational angle-detection sensor according to claim 4, wherein the conductive body comprises a plurality of metal contact flexures that create a plurality of slide contacts which increase the number of contact points with the resistive track and the first and the second communicator tracks.

6. The rotational angle-detection sensor according to claim 1, wherein the continuous resistive track is electrically connected to an input terminal and ground, while the first communicator track is electrically connected with a first output terminal and the second communicator track is electrically connected with a second output terminal.

7. The rotational angle-detection sensor according to claim 6, wherein the rotating disk is circular and the sensor housing defines a circular chamber which accommodates the circular rotating disk which maintains the plurality of slide contacts concentric with the continuous resistive track and the first and second communicator tracks.

8. The rotational angle-detection sensor according to claim 1, wherein the sensor housing comprises a sensor housing cover and a sensor housing base.

9. The rotational angle-detection sensor according to claim 1, wherein each of the continuous resistive track and the first communicator track are circular in shape while the second communicator track is semi-circular in shape, and the continuous resistive track surrounding both the first communicator track and the second communicator track.

10. The rotational angle-detection sensor according to claim 9, wherein a post, formed in a base of the rotation disk, engages with a pair of mating alignment holes formed in the conductive body to secure the conductive body to the rotating disk.

11. The rotational angle-detection sensor according to claim 1, wherein each of the continuous resistive track, the first communicator track and the second communicator track are circular in shape, and the continuous resistive track is located between the first communicator track and the second communicator track.

12. The rotational angle-detection sensor according to claim 11, wherein the rotating disk supports a pair of conductive bodies which each comprises a plurality of slide contacts, each of the conductive bodies extends from undersurface thereof and the plurality of slide contacts of the conductive bodies engage with the continuous circular resistive track, the first communicator track and the second communicator track, and the plurality of slide contacts of the conductive bodies are offset from one another by 90 degrees.

13. The rotational angle-detection sensor according to claim 12, wherein a pair of posts, formed in a base of the rotation disk, engages with mating alignment holes formed in the conductive bodies to secure the conductive bodies to the rotating disk.

14. A method of measuring an angle of rotation of a shaft relative to a sensor housing using a rotational angle-detection sensor, the method comprising:

accommodating a printed circuit board (PCB) within the sensor housing;

supporting on the printed circuit board (PCB):

an electrical input, a ground, and first and second electrical outputs, electrically connecting a continuous circular resistive track to the electrical input and to the ground, electrically connecting a first communicator track with the first electrical output, and electrically connecting a second communicator track with the second electrical output;

forming a rotating disk as a circular component which is accommodated within the sensor housing and designed to engage with and be rotated by a motor shaft, and the rotating disk supporting a conductive body for electrically engaging with the continuous circular resistive track and the first and the second communicator tracks;

supporting the continuous circular resistive track, the first communicator track and the second communicator track on a surface of the printed circuit board facing the rotating disk;

supporting the conductive body to face the continuous resistive track, the first communicator track and the second communicator track, and measuring the angle of rotation of the shaft, relative to the sensor housing, by integrating the first electrical output and the second electrical output with one another.

* * * * *